(12) United States Patent
Simpson et al.

(10) Patent No.: US 8,301,554 B2
(45) Date of Patent: Oct. 30, 2012

(54) SYSTEM AND METHOD FOR MANAGING MEETINGS BUDGETS AND ALLOCATING AND RECONCILING EXPENDITURES

(75) Inventors: Clarke Moir Simpson, London (GB); Olivier B. Sauser, Jouars Ponchartrain (FR)

(73) Assignee: American Express Travel Related Services Company, Inc., New York, NY (US)

(*) Notice: Subject to any disclaimer, the term of this patent is extended or adjusted under 35 U.S.C. 154(b) by 956 days.

(21) Appl. No.: 11/289,228

(22) Filed: Nov. 28, 2005

(65) Prior Publication Data

US 2007/0192199 A1 Aug. 16, 2007

Related U.S. Application Data

(60) Provisional application No. 60/695,729, filed on Jun. 30, 2005.

(51) Int. Cl.
*G06Q 40/00* (2012.01)

(52) U.S. Cl. ........................................... 705/38; 705/35

(58) Field of Classification Search .................... 705/35, 705/38
See application file for complete search history.

(56) References Cited

U.S. PATENT DOCUMENTS

| | | | |
|---|---|---|---|
| 5,253,166 A | 10/1993 | Dettelbach et al. | |
| 5,832,451 A | 11/1998 | Flake et al. | |
| 6,009,408 A | 12/1999 | Buchanan | |
| 6,023,679 A | 2/2000 | Acebo et al. | |
| 6,128,602 A | 10/2000 | Northington et al. | |
| 6,442,526 B1 | 8/2002 | Vance et al. | |
| 6,519,571 B1* | 2/2003 | Guheen et al. | 705/14.66 |
| 7,050,986 B1* | 5/2006 | Vance et al. | 705/5 |
| 7,054,823 B1* | 5/2006 | Briegs et al. | 705/2 |
| 7,395,231 B2 | 7/2008 | Steury et al. | |
| 7,539,620 B2 | 5/2009 | Winterton et al. | |
| 7,617,136 B1 | 11/2009 | Lessing et al. | |
| 2002/0007327 A1 | 1/2002 | Steury et al. | |
| 2002/0010686 A1 | 1/2002 | Whitesage | |
| 2002/0016729 A1* | 2/2002 | Breitenbach et al. | 705/9 |
| 2002/0026416 A1* | 2/2002 | Provinse | 705/39 |

(Continued)

FOREIGN PATENT DOCUMENTS

JP 2004110577 8/2004

(Continued)

OTHER PUBLICATIONS

U.S. Appl. No. 11/042,663, filed Jan. 24, 2005.

(Continued)

*Primary Examiner* — Muriel Tinkler
(74) *Attorney, Agent, or Firm* — Snell & Wilmer L.L.P.

(57) ABSTRACT

A system, method, and computer program product for managing meetings and allocating and reconciling expenditures. Scheduling information for a plurality of meetings is stored in a database. A plurality of budgets is stored in the database, each of the budgets being associated with and defining budget items for one of the plurality of meetings. Transaction data are received describing a plurality of expenditures made using at least one transaction account, wherein the transaction data comprise an amount expended for each of the plurality of expenditures. A selection of an expenditure, from the plurality of expenditures, and a selection of a meeting related to the selected expenditure from the plurality of meetings are accepted from a user. An allocation of at least a portion of the amount of the selected expenditure to a budget item for the selected meeting is accepted.

10 Claims, 8 Drawing Sheets

U.S. PATENT DOCUMENTS

| | | | | |
|---|---|---|---|---|
| 2003/0046195 | A1* | 3/2003 | Mao | 705/30 |
| 2003/0149632 | A1 | 8/2003 | Walker et al. | |
| 2003/0212617 | A1 | 11/2003 | Stone et al. | |
| 2004/0035922 | A1 | 2/2004 | Cameron | |
| 2004/0153348 | A1 | 8/2004 | Garback | |
| 2005/0256737 | A1* | 11/2005 | Liu | 705/2 |
| 2005/0289025 | A1 | 12/2005 | Fredericks et al. | |
| 2007/0016523 | A1 | 1/2007 | Blair et al. | |

FOREIGN PATENT DOCUMENTS

| | | |
|---|---|---|
| WO | 02017201 | 2/2002 |

OTHER PUBLICATIONS

U.S. Appl. No. 10/708,566, filed Mar. 11, 2004.
USPTO; Office Action dated Jan. 10, 2008 in U.S. Appl. No. 11/289,228.
USPTO; Office Action dated Sep. 16, 2008 in U.S. Appl. No. 11/289,228.
USPTO; Office Action dated May 27, 2009 in U.S. Appl. No. 11/289,228.
USPTO; Office Action dated Nov. 24, 2009 in U.S. Appl. No. 11/289,228.
USPTO; Office Action dated Apr. 13, 2010 in U.S. Appl. No. 11/289,228.
USPTO; Final Office Action dated Sep. 30, 2010 in U.S. Appl. No. 11/289,228.
USPTO; Advisory Action dated Dec. 8, 2010 in U.S. Appl. No. 11/289,228.
USPTO; Office Action dated Jan. 6, 2011 in U.S. Appl. No. 11/289,228.
USPTO; Final Office Action dated Jul. 11, 2011 in U.S. Appl. No. 11/289,228.
USPTO; Office Action dated Feb. 4, 2009 in U.S. Appl. No. 11/042,663.
USPTO; Final Office Action dated Aug. 20, 2009 in U.S. Appl. No. 11/042,663.
USPTO; Advisory Action dated Dec. 1, 2009 in U.S. Appl. No. 11/042,663.
USPTO; Office Action dated May 10, 2010 in U.S. Appl. No. 11/042,663.
USPTO; Final Office Action dated Oct. 29, 2010 in U.S. Appl. No. 11/042,663.
USPTO; Advisory Action dated Jan. 28, 2011 in U.S. Appl. No. 11/042,663.
USPTO; Office Action dated Mar. 25, 2011 in U.S. Appl. No. 11/042,663.
USPTO; Final Office Action dated Aug. 2, 2011 in U.S. Appl. No. 11/042,663.
AU; First Examiner's Report dated Mar. 30, 2010 in Application No. 2005271396.
AU; Second Examiner's Report dated Aug. 24, 2010 in Application No. 2005271396.
EP; European Search Report dated Mar. 23, 2009 in Application No. 05778268.2.
EP; Examination Report dated Jun. 4, 2009 in Application No. 05778268.2.
JP; Office Action dated Mar. 18, 2011 in Application No. 2007-525003.
MX; Office Action dated Aug. 2009 in Application No. MX/a/2007/001488.
CO; Office Action dated Apr. 2009, in Application No. 07.011.478.
PCT; International Search Report dated Mar. 2, 2006 in Application No. PCT/US2005/027792.
PCT; Written Opinion dated Mar. 2, 2006 in Application No. PCT/US2005/027792.
PCT; International Preliminary Report on Patentability dated Feb. 6, 2007 in Application No. PCT/US2005/027792.
http://web.archive.org/web/20040213185624.www47.
americanexpress.com/corporateservices/newsroom/press/press_26.asp.
"Core One Credit Union—Discover the Advantage", < http://coreone.org/2visa.html >, Copyright2001, (Last Visited Oct. 9, 2002).
Liam Lahey, "Microsoft Bolsters Rebate Structure", Computer Dealer News (Feb. 8, 2002).
Joan Goldwasser, "Best of the Cash-back Cards", Kiplinger's Personal Finance Magazine (Apr. 1999).
Gordon Carey, "Multi-tier Copay", Pharmaceutical Executive (Feb. 2000).
"New Evidence about Positive Three-Tier Co-pay Performance Presented at Express Scripts 2000Outcomes Conference", PR Newswire Association, Inc. (Jun. 28, 2000).
Eric Schmuckler, "Playing Your Cards Right", Forbes (Dec. 28, 1987).
Mary Kuntz, "Credit Cards as Good as Gold", Forbes (Nov. 4, 1985).
Judy Nyman, "Free Income Tax Clinics are Opening as Apr. 30 Deadline Draws Nearer", TheToronto Star (Mar. 25, 1986, Final Edition).
Michael Obel, "Oil Companies Push Marketing, Cost Cutting to Fortify Earnings", Oil &Gas Journal (Sep. 16, 1985).
"The Chase Manhattan Bank Today Announced a Comprehensive Program to Enhance the Value of All its Credit Cards", PR Newswire (Dec. 18, 1986).
"Credit Cards Offer Travelers New Benefit", PR Newswire (Aug. 5, 1987).
"Shell Introduces Optional Credit Card", The Associated Press (Sep. 3, 1985).
"Shell-Oil; Introduces Shell Signature Travel and Entertainment Credit Card", Business Wire (Sep. 3, 1985).
"Prestige Credit Cards: Those Pricey Plastics", Changing Times (Apr. 1986).
"Shell Introducing Expanded 'Signature' Credit Card", Tulsa Business Chronicle (Sep. 9, 1985).
"Judy Nyman, ""Free Income Tax Clinics are Opening as April 30 Deadline Draws Nearer"", TheToronto Star (Mar. 25, 1986, Final Edition)."
"Michael abel, ""Oil Companies Push Marketing, Cost Cutting to Fortify Earnings"", Oil &Gas Journal(Sep. 16, 1985)."
"""The Chase Manhattan Bank Today Announced a Comprehensive Program to Enhance the Value of All its Credit Cards"", PR Newswire (Dec. 18, 1986)."
USPTO; Advisory Action dated Sep. 29, 2011 in U.S. Appl. No. 11/042,663.
USPTO; Office Action dated Nov. 23, 2011 in U.S. Appl. No. 11/042,663.
USPTO; Advisory Action dated Oct. 28, 2011 in U.S. Appl. No. 10/708,566.
USPTO; Office Action dated Nov. 30, 2011 in U.S. Appl. No. 10/708,566.
USPTO; Office Action dated Nov. 25, 2011 in U.S. Appl. No. 10/628,731.
USPTO; Final Office Action dated Feb. 28, 2012 in U.S. Appl. No. 10/628,731.
USPTO; Final Office Action dated Apr. 19, 2012 in U.S. Appl. No. 11/042,663.
CR; Expert's Opinion received Feb. 3, 2012 in Application No. 8890.

* cited by examiner

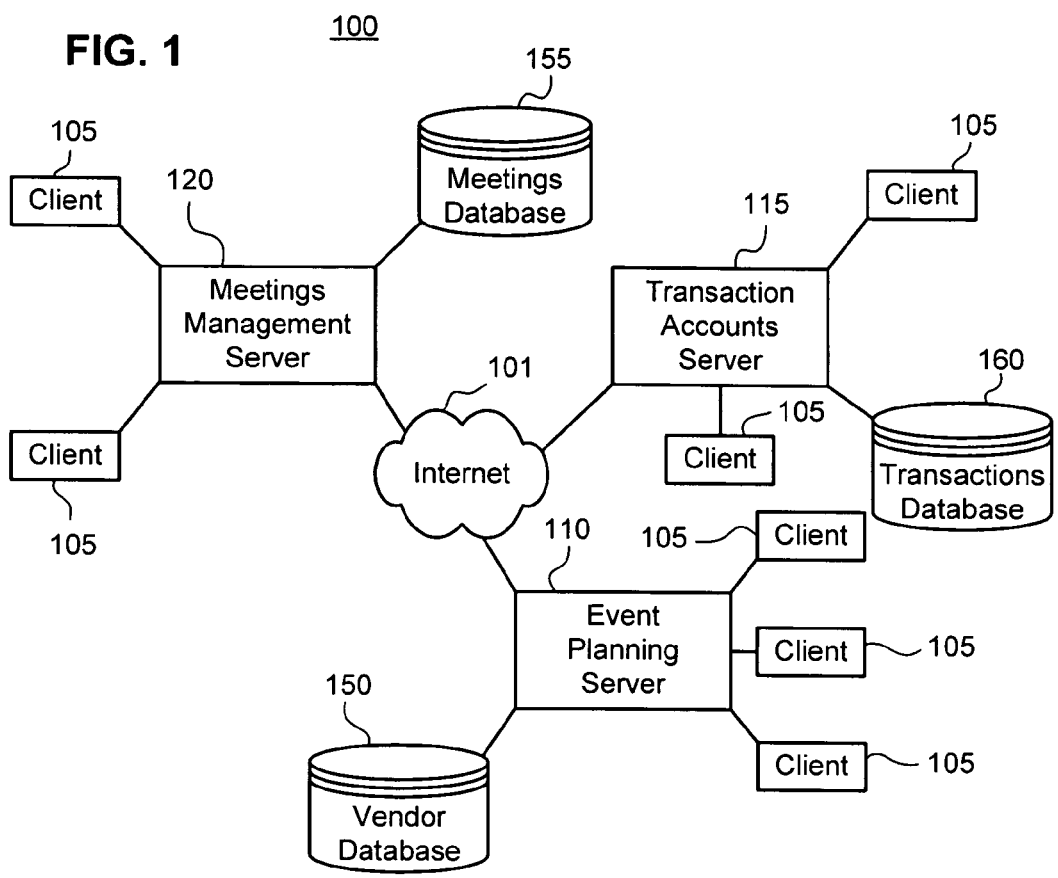
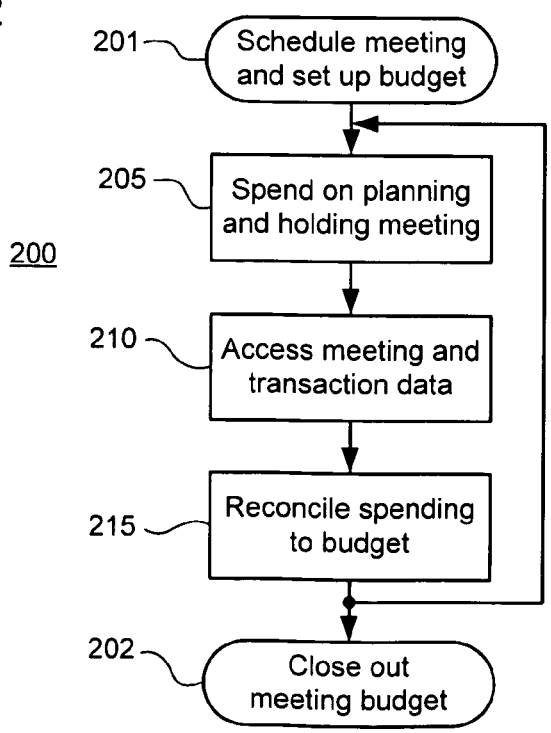

FIG. 4

Meetings and Events Calendar — 401

[◁ Previous]  [Jun ▽] [2005 ▽]  [Next ▷]

| Sunday | Monday | Tuesday | Wednesday | Thursday | Friday | Saturday |
|---|---|---|---|---|---|---|
|  |  |  | 1<br>○ 1 International Glaucoma Symposium | 2<br>○ 1 International Glaucoma Symposium | 3<br>○ 1 International Glaucoma Symposium | 4 |
| 5<br>○ 1 Nike Day<br>○ 2 HR Sharing Practices | 6<br>○ 1 HR Sharing Practices | 7<br>○ 1 HR Sharing Practices | 8<br>○ 1 HR Sharing Practices | 9<br>○ 1 HR Sharing Practices | 10<br>○ 1 HR Sharing Practices | 11 |
| 12 | 13 | 14<br>○ 1 Investigator Cardio | 15<br>○ 1 Investigator Cardio | 16<br>○ 1 Investigator Cardio | 17 — 410 | 18 |
| 19 | 20 | 21 | 22 | 23 | 24 | 25 |
| 26 | 27<br>○ 1 Investigator CANCER<br>— 412 | 28<br>○ 1 Investigator CANCER<br>○ 2 Mental Health Symposium | 29<br>○ 1 Mental Health Symposium | 30 |  |  |

Meeting Currency: British Pound Sterling | Meeting Name: 7th Annual Sales Conference — 510

Approved budget: £ 125,000 — 525

Category Budget Amounts: Enter costs for each category level.

| Category | Add Item | Category Code | Vendor | Initial Cost | Actual Cost | Comments |
|---|---|---|---|---|---|---|
| Accommodation Expenses | + | | Thistle Hotel Victoria | 20,000.00 | 17,988.45 | |
| Air Travel | + | | Unassigned | | | |
| Attendee Registration Costs | + | | Unassigned | | | |
| Audio and Visual | + | | Unassigned | | | |
| Cancellation Fees | + | | Unassigned | | | |
| Communication Costs | + | | Unassigned | | | |
| Contingency | + | | Unassigned | | | |
| Event Setup | + | | Unassigned | | | |
| Exhibit Costs | + | | | | | |

Summary

This is a summary page of all the Meeting Cards to which you have access. You can allocate transactions on your own cards, as well as view statements for any cards to which you have been granted access.

Filters:

Status: All ▽

Card number: All ▽

[Update]

| Status | Card Number | Billed Amount | Merchant | Merchant City | Ordered By | Transaction Date | Allocated Amount | Allocate |
|---|---|---|---|---|---|---|---|---|
| Pending | **** ****** *576 | £ 45,000.00 | The Dorchester | London | | 15 Oct 2004 | | Allocate |
| Allocated | **** ****** *644 | £ 112,000.00 | The Grosvenor House | London | Doe, Jane | 15 Oct 2004 | £ 112,000.00 | Allocate |
| Exception | **** ****** *401 | £ 7,000.00 | Celebrity Speakers International | Buckinghamshire | | 15 Oct 2004 | £ 5,000.00 | Allocate |

[Download Report ⇩]  [Print Report 🖨]

630 — Pending
631 — Allocated
632 — Exception

Allocation

| Item 1 | Item 2 | Item 3 |

Transaction Date  12 Nov 2002  — 730        Transaction ID        0000858614306826

Due for payment   20 Nov 2002              Financial Category
                          731

Establishment    MARINA DIY PLC             Code                  New Charge
                 126 SPRINGFIELD ST
                 CALEDON                    Industry              All Other
                 BT68 4TN
                          710                Currency              GBR  — 725

Exchange Rate         1.00000000

Assign to        7th Annual Sales Conference ▽    Expense Category   Accomodation Expenses ▽ meeting                                                                                    720
Local Amount     £50.00                     Total Allocated       £30.00    [Cancel] [Allocate]
Billed Amount    £50.00                     Amount to Allocate    [20.00]
                                                                            Category  Accommodation
                                                                              721          Expenses
Additional Information                                                      Item      Noga Hilton
TRAVEL MANCHESTER BTC                                                       Initial   £20,000.00
INVOICE 001174371  TRAVEL DATE 31/12/02 VISA/PASSPORT                       Actuals   £1,274.38
FEE                Destination DELHI

Allocation Report

Filters:

Card Number: 1-Oct-2004 ▽

Bill Date: 1-Oct-2004 ▽

Total Billed Amount: £52,000.00

[Update]

| Transaction Date | Transaction Number | Billed Amount | Merchant | Meeting Name | Budget Item | Budget Category | Allocated Amounts | Comments |
|---|---|---|---|---|---|---|---|---|
| 15-Oct-04 | 897765342 | £45,000.00 | The Dorchester | Annual Sales Meeting | Sleeping Rooms | Accommodations | £30,000.00 | |
| | | | | Annual Sales Meeting | Welcome Dinner | Food & Beverage | £7,000.00 | lobster |
| | | | | Annual Sales Meeting | Breakfast & Lunch | Food & Beverage | £3,000.00 | steak and kidney pie |
| | | | | | | Allocated Amount: | £40,000.00 | |
| | | | | | | Unallocated Amount: | £5,000.00 | additional charges in dispute |
| | | | | | | Transaction Total: | £45,000.00 | |

800

830 points to "15-Oct-04"
840 points to "Allocated Amounts" column
841 points to £30,000.00 row
842 points to £40,000.00 row

SYSTEM AND METHOD FOR MANAGING MEETINGS BUDGETS AND ALLOCATING AND RECONCILING EXPENDITURES

CROSS REFERENCE TO RELATED APPLICATIONS

This application claim priority to, and the benefit of, U.S. Provisional Patent Application Ser. No. 60/695,729, filed Jun. 30, 2005, which is hereby incorporated by reference in its entirety.

BACKGROUND OF THE INVENTION

1. Field of the Invention

The present invention generally relates to systems, methods, and computer program products for meetings management, allocation, and reconciliation, and more particularly to an automated solution for managing billing, reconciliation, and payment of financial transaction instruments for meetings.

2. Related Art

Many business organizations send their employees to meetings. An organization may plan, arrange, or host a meeting or it may send one or more members to attend a meeting. Typically, an organization employs individuals known as event planners, who manage the meeting activities of the organization. An event planner may manage meetings for one subunit of an organization or for multiple subunits. Also, an event planner may manage one meeting at a time or may manage multiple meetings that overlap in time.

One system that is currently available for managing meetings is a computer that maintains a calendar of meetings. Such a computer can allow access to authorized users, who may be event planners, employees who attend meetings, executives of the organization, and others. Event planners can establish meetings and provide information about their times and locations. In addition, event planners can provide information about preferred hotels, airlines, and other travel providers for particular meetings. Employees who will attend a given meeting can view the relevant information.

One problem with available systems and methods of managing meetings is that it is difficult to account for meeting expenditures. Meeting expenditures differ in important ways from other business spending. One difference is that an organization may make expenditures for items that are peculiar to meetings, such as, for example, promotional materials, hotels, caterers, air travel, or other travel providers. Also, a meeting typically takes place in a particular location, where the organization may not often do business. The vendors that provide goods and services for the meeting may operate only locally, and the organization may not have long-term relationships with them. Thus, the organization may not be able to pay them with its ordinary processes.

Further, spending for a particular meeting commonly takes place only during preparing, planning and holding the meeting and shortly thereafter. Thus, a meeting typically involves large amounts of spending in a short period of time. Since the spending period may be shorter than ordinary budgeting periods, an organization may not be able to measure and control the spending using its ordinary processes. In addition, meeting expenditures may be made by event planners or by employees who attend meetings. These individuals may only be authorized to spend money for meetings and thus, may not be regular participants in an organization's ordinary financial processes.

For the above-stated reasons as well as others, an organization may have difficulty measuring and controlling meeting expenditures. Organizations need to measure and control spending to fulfill duties of fiscal responsibility, to ensure that employees spend only as they are authorized, and to ensure that they are operating at the lowest cost possible. Some organizations maintain specialized meetings management teams to perform these functions, but such teams can be expensive and slow.

Typically, an organization may ease the managing of meetings by distributing to its employees a financial transaction instrument with which they can spend on meetings. Such an instrument may be, for example, a charge or credit card. Such an instrument may be generically referred to as a meeting expense card. One example of such an instrument is the Meeting Card from American Express. Usually, a meeting expense card enables an individual to pay a vendor directly without the need for a pre-existing vendor-client relationship between the organization and the vendor.

However, while generally good for their intended applications, conventional meeting expense cards enable only limited measurement and control of spending. One problem with such cards is that they lack sufficient identifiers for expenditures, so that it is difficult to identify an expenditure with the meeting for which it was made. Another problem with conventional meeting expense cards is that they do not effectively track employee spending and reconcile it against original approved meeting budgets. Typically, an event planner will inspect a printed record of recent expenditures. To compare the actual amount of spending for a meeting to its budget, expenditures for that meeting must be found in multiple printed records and tallied. This time-consuming process is ordinarily performed infrequently, and even when it is done, it may occur after a meeting has ended. Thus, it is difficult to identify overspending or ensure that charges are correct for payment purposes. With conventional meeting expense cards, it may still be difficult to manage spending on meetings as it occurs.

Given the foregoing, what are needed are a system, method and computer program product for meetings management, allocation, and reconciliation.

BRIEF DESCRIPTION OF THE INVENTION

The present invention meets the above-identified needs by providing a system, method and computer program product for meetings management, allocation, and reconciliation.

In accordance with one embodiment of the present invention, there are provided a system, method, and computer program product for managing meetings and allocating and reconciling expenditures. Scheduling information for a plurality of meetings is stored in a database. A plurality of budgets is stored in the database, each of the budgets being associated with and defining budget items for one of the plurality of meetings. Transaction data are received describing a plurality of expenditures made using at least one transaction account, wherein the transaction data comprise an amount expended for each of the plurality of expenditures. A selection of an expenditure from the plurality of expenditures and a selection of a meeting related to the selected expenditure are accepted from a user. An allocation of at least a portion of the amount of the selected expenditure to a budget item for the selected meeting is accepted.

An advantage of the present invention is that it provides integration with electronic transaction account data files. As a result, it enables efficient and automated reconciling of expenditures to budgets. Thus, the invention provides for less costly management of meetings.

An additional advantage of the present invention is that it enables reconciliation to take place on a more frequent basis. Expenditures can be reconciled daily. By allowing frequent comparisons between the amounts of actual spending and the amounts of pre-approved budgets, the invention increases organizations' knowledge of and control over spending.

An additional advantage of the present invention is that it provides robust information about the management of meetings. By automating the reconciliation of expenditures, the invention decreases the number of errors. Also, it allows expenditures to be classified in various ways, such as for example by event or by expense category. Such classification allows an organization to learn better how it is spending on meetings and devise ways to spend less. Thus, the invention provides for lower direct costs of meetings.

An additional advantage of the present invention is that it provides for charging amounts of spending to specific sub-units or projects within an organization. Also, it enables comprehensive reporting of budgets and spending, so that sub-units can plan their spending on meetings more precisely.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 1 is a system diagram of an exemplary system for meetings management, allocation, and reconciliation, in which the present invention, in one embodiment, would be implemented.

FIG. 2 is a flowchart illustrating a process performed by a user for managing meetings and allocating and reconciling expenditures, according to one embodiment of the present invention.

FIG. 4 is an exemplary window or screen shot generated by the graphical user interface of the present invention, in one embodiment, showing a step of storing scheduling information for meetings.

FIG. 5 is another exemplary window or screen shot generated by the graphical user interface of the present invention, in one embodiment, showing a step of storing budget items for a meeting.

FIG. 6 is another exemplary window or screen shot generated by the graphical user interface of the present invention, in one embodiment, showing a step of accepting a selection of an expenditure.

FIG. 7 is another exemplary window or screen shot generated by the graphical user interface of the present invention, in one embodiment, showing a step of accepting a selection of a meeting.

FIG. 8 is another exemplary window or screen shot generated by the graphical user interface of the present invention, in one embodiment, showing a step of accepting an allocation of an amount of an expenditure to a budget item.

DETAILED DESCRIPTION

I. Overview

Figure 3:
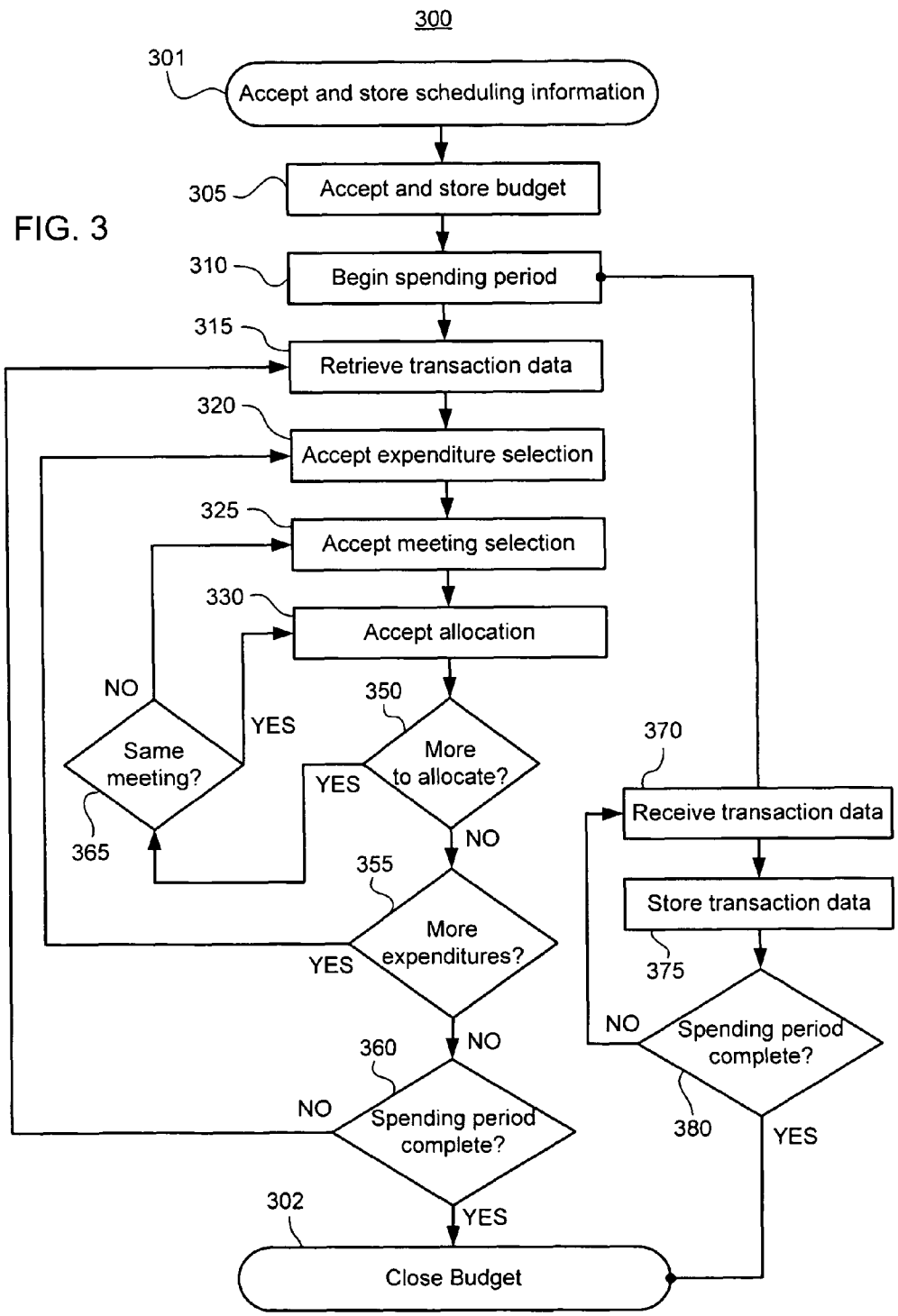
FIG. 3 is a flowchart illustrating a process performed by a general-purpose computer for managing meetings and allocating and reconciling expenditures, according to one embodiment of the present invention.

The present invention is directed to a system, method, and computer program product for managing meetings and allocating and reconciling expenditures. The present invention is now described in more detail herein in terms of the above exemplary system, method, and computer program product. This is for convenience only and is not intended to limit the application of the present invention. In fact, after reading the following description, it will be apparent to one skilled in relevant arts how to implement the following invention in alternative embodiments.

In general, a user is any person or entity capable of accessing, using, being affected by and/or benefiting from the tool that the present invention provides for managing meetings and allocating and reconciling expenditures. In particular, users may be employees of business organizations, managers within business organizations, event planners, or the like.

Also in general, a meeting is an event or project in which individuals from one or more business organizations participate. Meetings may be, but are not limited to, technical conferences, sales conferences, trade shows, customer visits, board meetings, press conferences, marketing demonstrations, exhibitions, and corporate retreats. Meetings generally take place over limited periods of time. A business organization generally makes expenditures on a particular meeting while the meeting is being prepared and planned, while the meeting is taking place, and shortly thereafter.

In general, a transaction account may include any device, code, number, letter, symbol, digital certificate, smart chip, digital signal, analog signal, biometric or other identifier/indicia suitably configured to allow an individual to access, interact with or communicate with a financial transaction system. In general, transaction accounts may be used for transactions between the individual and a payee through any suitable communication means, such as, for example, personal communication, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

A transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be a traditional plastic transaction card, a titanium-containing, or other metal-containing, transaction card, a clear and/or translucent transaction card, a foldable or otherwise unconventionally-sized transaction card, a radio-frequency enabled transaction card, or any other type of transaction card, such as a credit, charge, debit, pre-paid or stored-value card, or any other like financial transaction instrument.

In general, transaction data are pieces of information that describe expenditures made using a transaction account. Transaction data may include, but are not limited to, the amount of the expenditure, the identity, address, and financial account information of the recipient of the amount, the date of the expenditure, a unique number identifying the expenditure, and the status of the expenditure as, for example, paid or disputed.

II. System

Referring to FIG. 1, a system diagram of an exemplary meetings management system 100 in which the present invention, in an embodiment, would be implemented is shown.

System 100 includes meetings management server 120, which may be operated by an organization to manage its own meetings or by a service organization to enable meetings management for other organizations. In some embodiments, server 120 may run software that prepares electronic documents written in a computer language such as, for example, hyper-text mark-up language ("HTML"), dynamic HTML, virtual reality modeling language ("VRML"), extensible mark-up language ("XML"), server query language ("SQL"), or related computer languages. In other embodiments, server 120 may prepare electronic documents written in a proprietary document format, such as Oracle database format, Microsoft Word format, or other electronic formats. Server 120 may send such documents to clients, as described below, over an electronic network, such as, for example, the Internet, a local area network, or a wide area network. Also, server 120 may be accessed by use of clients running software appropriate for viewing the electronic documents. For documents written in HTML or XML, such software may include browsers such as Netscape Navigator, Microsoft Internet Explorer, or the like. For documents written in SQL, such software may include database client software, such as, for example, MySQL.

Server 120 accepts scheduling information for meetings, possibly including the dates of the meeting; dates, times, and/or locations of events associated with the meeting; dates, times, and/or locations of events associated with planning or preparing the meeting; dates, times, and/or route information for travel by participants to or from the meeting; contact information for participants in the meeting; or the like. In general, scheduling information may be entered by a user or group of users who are planning a meeting. Server 120 also presents scheduling information on demand. Presenting scheduling information can entail communicating selected information for a particular meeting, communicating selected information for all meetings within a range of dates or locations, or the like. For example, server 120 could cause a terminal to display a calendar showing all meetings scheduled in a particular month, as illustrated in FIG. 4.

Server 120 also accepts budgets associated with meetings, each budget defining budget items. A budget item may be a specific task necessary for preparing, planning, or holding a meeting, such as, for example, a meal at a particular time; or a category of such tasks, such as the category of all meals during a meeting. Also, a budget item may be a good or service required for the meeting, such as, for example, a speaker at a meeting; or a collection of such goods or services, such as, for example, entertainment for a meeting. Typically, a budget also includes information on the amounts of resources dedicated to each budget item, such as, for example, money to be spent, time to spent by one or more employees, or equipment to be used. In general, a budget may be entered by a user or a group of users who are planning a meeting. Server 120 can present budgets on demand, by for example causing a terminal to display a table listing budget items for a particular meeting.

Server 120 is in communication with meetings database 155, which stores scheduling information for meetings and/or their associated budgets as communicated to it by server 120. Database 155 can retrieve scheduling information and/or budgets and communicate them to server 120.

Server 120 is also in communication with clients, such as remote terminals, personal computers, notebook computers, handheld computers, or the like. Server 120 accepts administration information from the clients, such information including, for example, software updates, authorization of users and other changes in user status, or software maintenance commands.

System 100 also includes event planning server 110, which may be operated by a business organization to plan its meetings. Server 110 communicates with server 120 to relay information and budgets of meetings. Further, server 110 accepts vendor information, which describes suppliers of goods or services who are known to an organization. Vendors may operate only in specific locations or may operate over geographical regions. Vendor information may be contact information for a vendor, a contract with a vendor to provide a specific budget item, a request for an offer from a vendor to provide a specific budget item, or the like. Vendor information may be entered by a user or a group of users who are planning a meeting or by a vendor described by the information. Server 110 can also present vendor information on demand. For example, server 110 could provide a list of hotels in a particular location, provide the address for a particular vendor, provide an alphabetical list of vendors, or the like.

Server 110 is in communication with a vendor database 150, which stores and retrieves vendor information as communicated to it by server 110.

Server 110 is also in communication with clients 105, such as remote terminals, personal computers, notebook computers, handheld computers, or the like. Clients 105 enable users to enter scheduling information, budgets, vendor information, or other meetings information and communicate such information to server 110. Server 110 relays the meetings information to server 120. Clients 105 also enable users to enter commands, request meetings information from server 110 and server 120, enter selections of meetings information or expenditures, and enter allocations of amounts of expenditures, as described in greater detail below. Server 110 communicates such commands, requests, selections, and allocations to server 120 and receives responses thereto. Clients 105 communicate such responses to users.

System 100 further includes transaction accounts server 115, which provides, on request, transaction data describing expenditures made using one or more transaction accounts. In general, a request for transaction data can include a range of dates and times and a list of transaction accounts. Server 115 provides transaction data describing expenditures made within this range of dates and times, as well as data describing expenditures within this list of transaction accounts. Server 115 is in communication with clients, from which it accepts administration information, such information including software updates, authorization of users and other changes in user status, software maintenance commands, or the like.

Server 115 is also in communication with transactions database 160, which may be called a transactions database, which stores transaction data describing expenditures made using one or more transaction accounts, retrieves transaction data on request, and communicates transaction data to server 115.

Servers 110, 115, and 120 are in communication through network 101. Network 101 may be the Internet, a corporate intranet, a subnetwork to which access is restricted, a wireless network, or other electronic networks.

Server 120 also requests and receives from server 115 transaction data describing expenditures within a range of dates and times. The data are for transaction accounts, and in some embodiments, the transaction accounts are credit cards issued by a particular financial institution. Database 160 and server 115 may be maintained by such a financial institution to store, retrieve, and communicate transaction data to organizations that use the credit cards.

Server 120 requests and receives transaction data on a regularly scheduled basis and selects ranges of dates and times that correspond to the schedule. Server 120 may also accept data on expenditures made using other payment methods, such as purchase orders, wire transfers, checks, cash, or the like.

Server 120 further provides summaries of expenditures to users through server 110 and clients 105. The summaries may include a limited amount of transaction data, such as, for example, dates and amounts of expenditures. The summaries may include transaction data for limited collections of expenditures. A collection may be limited to expenditures made using transaction accounts within a user's access privileges, expenditures within a particular range of dates and times, expenditures with amounts greater or lesser than a particular amount, expenditures that have not been reconciled, expenditures that are disputed, or in other ways known in the art.

In addition, server 120 accepts a selection of a particular expenditure. A selection may be entered through one of clients 105 and communicated to server 120 through server 110. Alternatively, a selection may be made by server 110. Server 120 may respond to a selection by presenting a list of meetings, by for example causing a client 105 to display a menu of meetings. The list of meetings may be limited by date, by location, by a user's access privileges, or in other ways known to those skilled in relevant arts.

Server 120 also accepts a selection of a particular meeting by a user or by server 110. In response, server 120 can present budget items for a selected meeting. In addition, server 120 accepts an allocation of at least a portion of the amounts of a selected expenditure to a budget item for a selected meeting. An allocation may be entered by one of clients 105 and communicated to server 120 through server 110. Alternatively, an allocation may be made by server 110.

The transaction data received by server 120 are stored by database 155. Further, database 155 stores allocations of amounts of expenditures to budget items, as communicated to it by server 120.

In general, server 120 and database 155 may be separate computers that communicate through a network, through a dedicated communications link, through a data bus, or by other methods known in the art. Alternatively, server 120 and database 155 may be one computer that operates alternately or concurrently as server 120 and database 155. Similarly, server 115 and database 160 may be separate computers or a single computer; and server 110 and database 150 may be separate computers or a single computer. Server 110, 115, or 120 may also operate as clients. In some embodiments, server 110 and server 120 are a single computer that operates as both servers.

Communications between servers, databases, and clients generally occur through electronic networks, dedicated communications links such as, for example, serial or parallel busses, intra-computer data busses, wireless networks, or the like.

III. Process

Referring to FIG. 2, a flowchart illustrating a process 200 performed by a user for managing meetings, according to one embodiment of the present invention, is shown. This process may be performed in whole or in part by using system 100.

Process 200 begins at step 201, in which a user enters scheduling information for a meeting and sets up the associated budget. Scheduling information, such as, for example, when and where a meeting will be held and what events it will entail, may be entered through a client 105. Entering scheduling information can involve entering information on a computerized form, such as, for example, a web page displayed by browser software running at client 105. Alternatively, it could involve sending electronic mail containing, among other things, the information, from a user's mail account to an automated mail reader. As yet another alternative, it could involve uploading a file to server 120 using a protocol such as File Transfer Protocol. Other methods of entering information are also known in the art.

Setting up a budget involves entering budget items defined by the budget, for example at a terminal corresponding to client 105. Setting up the budget also involves entering amounts of resources approved for dedication to each budget item, e.g., the amount to be spent for the particular budget item. In addition, a cost center may be specified for each budget item, which identifies, for example, a particular subunit of a business entity to be charged for the budget item. A project code and other identifying information also may be specified for each budget item to facilitate categorization of the budget items for analysis purposes. For example, a budget item may include a purchase order or invoice number, which would facilitate financial reporting and electronic reconciliation with financial ledgers and other accounting records.

Steps 205 through 215 are repeated during the course of planning and holding the meeting and immediately afterward. The process here described relates to one meeting, of a number of meetings, that may be in preparation or in progress concurrently or consequently. While a user is in the cycle of steps 205 through 215 for one meeting, he or she may be in a similar cycle for other meetings. In such case, he or she may initiate another meeting in a step corresponding to step 201, or may conclude a meeting in a step corresponding to step 202. The exemplary process here described is not meant to limit the number of meetings that can be managed using this process or system 100.

In step 205, one or more users prepare, plan, hold, and/or complete a meeting. During this step, the one or more users spend resources, such as money, time, or equipment. The spending may include expenditures made using one or more transaction accounts, such as, for example, meeting expense cards. Expenditures can include directed procurement, sometimes known as travel management, such as, for example, payments for catering, deposits for hotel reservations, costs of air travel, payments for event planning services, costs of preparing exhibits or demonstrations, advertising expenses, or the like. Alternatively, expenditures may be individual expenditures by participants in a meeting, such as, for example, meal expenses, hotel charges, travel expenses, or the like.

In step 210, a user establishes a connection with a server such as server 110 or server 120, through a client corresponding to client 105. Then the user accesses information for meetings in preparation or in progress and transaction data describing expenditures. Transaction data may describe an expenditure by, for example, listing its date, its amount, and the recipient of the amount. The expenditures may be related to the meetings, or some of the expenditures may be unrelated. The meetings information and transaction data are provided by server 120. The server will have received transaction data in another step of the process 300, as described below.

The user performs step 210 occasionally throughout the period of planning and holding the meeting. In general, the user accesses expenditures made since the last performance of step 210. In some embodiments, the user also accesses other expenditures.

In step 215, the user reconciles expenditures for meetings to their associated budgets, as will be described in greater detail below. In reconciling expenditures, a user allocates the amounts of expenditures to budget items for their related meetings. As a result, the allocated amounts can be compared to the amounts that were dedicated to the budget items in step 201.

Steps 205, 210, and 215 are repeated continually throughout the duration of the meeting to which the instant process is related. The steps may be performed in any order and with differing frequencies, as needed. For example, a user may access transaction data daily but may make expenditures for a meeting only occasionally. The user may reconcile expenditures at the end of each day on which expenditures have been made for the meeting. Alternatively, a user may access transaction data and reconcile expenditures only at the end of every month.

When a meeting is completed, the instant process 200 terminates in step 202. A meeting may be completed at the end of its scheduled dates and times. Alternatively, a meeting may be completed when meeting completion tasks, such as, for example, travel returning from a meeting, cleanup of event locations, or publication of conference proceedings, have been done. In some embodiments, a meeting is not completed until all the related expenditures have been reconciled.

Step 202, in which the instant process related to a meeting terminates, may include closing out the associated budget. In some embodiments, the user may request from server 120 a summary of budget items for the meeting and the amounts of expenditures allocated to the budget items. In other embodiments, the user may direct server 120 to remove scheduling information for the meeting from database 155. However, in an alternative embodiment, step 202 may not involve any operations on the meeting's information in database 155 whatsoever.

Referring to FIG. 3, a flowchart illustrating a process 300 performed by a general-purpose computer for managing meetings, according to one embodiment of the present invention, is shown. This process may be performed in whole or in part by system 100.

Process 300 begins at step 301, in which scheduling information for a meeting is accepted. As described above, scheduling information may be accepted by a server corresponding to server 120 and stored in a meetings database. In step 305, a budget associated with the meeting is stored and accepted. The budget defines budget items for the meeting and may also include amounts of resources dedicated thereto. The budget may define budget items at various levels of detail and for various portions of a meeting. For example, a budget item could be breakfast on one day of a conference, to which an amount of money is dedicated. As another example, a budget item could be the hotel charges for one participant for the length of a meeting. As yet another example, a budget item could be car rentals of the meeting's participants.

Scheduling information, in step 301, or the budget, in step 305, may be accepted as electronic mail containing, among other things, the scheduling information or at least a portion of the budget; as data entered in a computerized form; as a file or collection of files transferred over an electronic network or data bus; or the like.

In step 310, the period begins during which the expenditures are made for preparing, planning, holding, and closing the meeting. The process then proceeds in two parallel sequences.

The two parallel sequences are repeated during the course of planning, preparing, and holding the meeting and shortly thereafter. The process here described relates to one meeting of a number of meetings that may be in preparation or in progress concurrently or consequently. While the instant process is performed for one meeting, other meetings may be in similar cycles of these steps, while yet other meetings may be earlier in the process at steps 301 or 305 or later in the process at step 302. The exemplary process here described is not meant to limit the number of meetings that can be managed using this process or system 100.

In step 370, transaction data are received, for example from a transaction accounts server like server 115. The transaction data may describe expenditures made using specified transaction accounts, such as those that a particular business organization or individual is authorized to use. The expenditures may be those made during a specified range of dates and times. Other criteria, known in the art, may be used to limit the expenditures described by the received transaction data. Alternatively, the expenditures may be those selected by a transaction accounts server. In some embodiments, step 370 may also include accepting data on expenditures made using other methods, such as purchase orders, wire transfers, checks, cash, or the like. In step 375, the transaction data are stored in a database such as, for example, database 155.

In step 380, the transaction data branch of the process may return to step 370. In some embodiments, the cycle of steps 370 through 380 is not related to a particular meeting, and step 370 succeeds step 380 continually. In other embodiments, a meeting may be related to a particular limitation or modification of steps 370 through 380. For example, one or more transaction accounts may be used only for that meeting. While the meeting is in planning or in progress, step 370 may include receiving transaction data for those transaction accounts. When the meeting is completed, receipt of data for those accounts may cease.

In general, the cycle of steps 370 through 380 may take place on a regularly scheduled basis. For example, transaction data may be received daily or monthly. A range of dates and times limiting the expenditures described by received transaction data may correspond to the type of scheduling basis employed. For example, if the transaction data are received every day at a specific time, the expenditures may be those made during the preceding day. Other scheduling bases and ranges of dates and times are possible, as those skilled in relevant arts will readily appreciate. Alternatively, the cycle may take place on an irregular or unscheduled basis. For example, step 370 may be triggered by an event, such as a user's access of a server, such as server 110.

Steps 370 through 380 may be performed continually throughout the meetings management process. In general, steps 370 through 380 may not relate to particular meetings. Indeed, these steps may take place continually during periods when no meetings are in planning or in progress. Alternatively, in some embodiments steps 370 through 380 may be performed more or less frequently depending on how many meetings are in planning or in progress. In some embodiments steps 370 through 380 may relate specifically to a particular meeting, and the cycle of those steps related to that meeting may terminate when the meeting is completed.

In parallel with the cycle of steps 370 through 380, a cycle of steps 315 through 360 is performed. In step 315, transaction data are retrieved, such as from a database corresponding to database 155. The transaction data may be limited in various ways. For example, they may be the data received most recently or the data describing expenditures in the previous day. As another example, they may be data describing all unreconciled expenditures. As yet another example, they may be data for specific transaction accounts to which a particular user has access. Other criteria, known in the art, may be used to limit the retrieved data.

In step 320, a selection of an expenditure is accepted. This step may also involve presenting a summary of expenditures, such as, for example, a list of dates, amounts, and/or other information describing expenditures. The summary may be presented to a user by a client 105, to a server through an electronic network, or the like. Accepting a selection may involve any of the methods of communicating with users described above. For example, it may involve detecting a user's selection of a hyperlink in a page displayed by browser software.

In step 325, a selection of a meeting to which the expenditure is related is accepted. In some embodiments, this step may also include presenting more detailed transaction data describing the selected expenditure. In addition, this step may include presenting a list of meetings available to be selected. Presenting a list can involve any of the presentation methods discussed above. Accepting a selection can involve any of the acceptance methods discussed above.

In step 330, an allocation is accepted. In this step, at least a portion of the amount of an expenditure is assigned to a budget item. The portion may extend to the full amount. That portion then represents some of the resources that were dedicated to the budget item. The allocation is stored in the database together with the budget item. When a report of a budget for a meeting and its related expenditures is later requested from a server like server 120, the allocated amounts can be reported with their budget items. Thus it can be apparent whether more resources have been spent on a budget item than were dedicated to it. In some embodiments, the total amount allocated to a budget item may be calculated in step 330, and a warning may be presented if the total amount allocated exceeds the amount dedicated to the budget item.

Also, since a meeting may be held in a location where the currency differs from the currency of an organization's accounts, in some embodiments step 330 may include converting the amount of an expenditure from one currency to another currency. For example, the amount of the expenditure may be converted to the currency appropriate for the organization's accounts.

Further, in some embodiments step 330 may include charging the allocated amount to a subunit of the organization.

In step 350 it is determined whether the full amount of an expenditure has been allocated. If it has not, the process may proceed to step 365. In step 365, it is determined whether the next portion of the amount will be allocated to a budget item for the same meeting as the previous portion. If yes, the process proceeds to step 330 and accepts an allocation of at least another portion. If no, the process proceeds to step 325 and accepts a selection of another meeting.

If the full amount of an expenditure has been allocated, the process proceeds to step 355. However, it may be possible to proceed to step 355 without allocating the full amount of a particular expenditure, if a user desires. In other embodiments, step 350 may be omitted, and the process may proceed to step 355 after every partial allocation of an expenditure. Alternatively, in some embodiments, the process may not proceed to step 355 unless the full amount of an expenditure has been allocated.

In step 355, it is determined whether more expenditures are to be reconciled. If yes, the process proceeds to step 320 to accept a selection of another expenditure. In some embodiments, the process proceeds to step 320 unless all available expenditures have been reconciled. In other embodiments, a user may choose to stop reconciling expenditures so that the process proceeds to step 360.

In step 360, it is determined whether the period of spending for a meeting is over. The spending period can include the time during which the meeting is prepared, planned, held, and completed. Alternatively, the spending period can include only subsets of such time. If the spending period for a particular meeting is over, the meeting budget is closed, step 302. Although cycles of retrieving transaction data and reconciling expenditures continue in steps 370 through 380, the instant process relating to the meeting is finished. In some embodiments, the meeting can no longer be selected in a step 325. In other embodiments, the scheduling information and/or budget associated with the meeting are stored in a separate database. In yet other embodiments, a meeting continues to be available for selection.

FIG. 4 is an exemplary window or screen shot generated by the graphical user interface of the present invention, in one embodiment, showing a step of storing scheduling information for meetings. Image 400 is a table in the form of a calendar of meetings. Entry 401 is a date on the calendar, a Monday. Entry 410 is an example of entries on the calendar showing a meeting, entitled "HR Sharing practices", that is scheduled to take place over a week and end on a Friday. Entry 411 shows the first day, a Monday, on which conference "Investigator CANCER" is scheduled to take place. Entry 412 shows that on the second day of the "Investigator CANCER" conference, another conference entitled "Mental Health Symposium" is scheduled to begin.

FIG. 5 is another exemplary window or screen shot generated by the graphical user interface of the present invention, in one embodiment, showing a step of storing budget items for a meeting. Image 500 is a table and associated information. Line 510 is the name of a meeting, "7$^{th}$ Annual Sales Conference". Line 525 is the currency in which expenditures for the meeting will be made. The table has columns labeled "Category", "Vendor", "Initial Cost", "Actual Cost", and "Comments". The table also includes a column labeled "Add Item". A user may select the image of a plus sign in a particular row at this column to begin entering another budget item.

Line 520 shows a budget item that has already been accepted, in the category of accommodation expenses. In this instance, a vendor has been chosen for the budget item, and an amount of £20,000 has been dedicated to the budget item. The budgeted amount may be compared against the actual cost, which in this example is £17,988.45. The actual cost is based on the results of the transaction data reconciliation process 300 discussed above. Displaying the actual cost of budget items in this manner allows the budget items to be tracked on a "real time" basis against initial estimates, thereby providing timely feedback as to the accuracy of initial budget estimates.

FIG. 6 is another exemplary window or screen shot generated by the graphical user interface of the present invention, in one embodiment, showing a step of accepting a selection of an expenditure.

Image 600 shows a table summarizing expenditures that has been presented to a user at a client such as client 105. Lines 630, 631, and 632 show three expenditures in different stages of reconciliation. The status of each expenditure is shown in the first column of the table. The number of the transaction account with which each expenditure was made is shown in the column labeled "Card Number". The amount of each expenditure is shown in the column labeled "Billed Amount". The vendor to whom the amount of each expenditure was paid is named in the column labeled "Merchant Name", and the general location of each vendor is shown in the column labeled "Merchant City". The date of each expenditure is shown in the column "Transaction Date".

The column labeled "Allocated Amount" shows the total portion of the amount of each expenditure that has been allocated. For line 630, none of the amount of £45,000 has been allocated. A user may select the text "Allocate" in the last column of line 630 to select the expenditure of line 630 to allocate all or a portion thereof. For line 632, only £5,000 of the total amount of £7,000 has been allocated. A user may select "Allocate" in line 632 to allocate the remaining £2,000. For line 631, all of the amount of £112,000 has been allocated. A user may select "Allocate" for the expenditure of line 631 to change the allocation of some or all of the amount allocated for the expenditure of line 631.

FIG. 7 is another exemplary window or screen shot generated by the graphical user interface of the present invention, in one embodiment, showing a step of accepting a selection of a meeting.

Image 700 includes a table of detailed transaction data and other information. Line 730 shows the date of an expenditure that has already been selected. Line 731 shows the name and address of the vendor to which the amount of the expenditure was paid, and line 725 shows the currency of the expenditure.

Line 710 is a menu with which a user can select a meeting. In image 700, a user has already selected "7$^{th}$ Annual Sales Conference". In response, the user has been presented a menu of budget categories, line 720. In this instance, the user has selected "Accommodation Expenses". Further, the user has selected a budget item from this category, line 721.

FIG. 8 is another exemplary window or screen shot generated by the graphical user interface of the present invention, in one embodiment, showing a step of accepting an allocation of an amount of an expenditure to a budget item.

Image 800 is a table showing portions of amounts of a selected expenditure and budget items to which the portions have been allocated. Line 830 shows some transaction data describing an expenditure, such as the date of the expenditure, a unique number identifying the expenditure in the column labeled "Transaction Number", and the total amount of the expenditure. In this instance, line 840 shows a portion of the amount, £30,000, that has been allocated to the budget item "sleeping rooms". Line 841 shows a portion of the amount, £7,000, that has been allocated to the budget item "welcome dinner". Line 842 shows a portion of the amount, £3,000, that has been allocated to the budget item "breakfast & lunch". A portion of the amount, £5,000, has not yet been allocated. A user may further allocate this portion.

The allocation process 300 described above greatly enhances the quality of management reporting, as it allows the breakdown of budgetary information in detail, e.g., by event, cost center, budget category, etc. and also may provide additional metrics, such as average delegate cost, average meeting cost, etc. This fine-grained level of reporting and analysis is particularly important for purchasing management in jurisdictions that require detailed reporting of meetings for legal and tax reasons, e.g., Germany, France, Italy, and to a lesser extent, the U.S.

IV. Example Implementations

The present invention (i.e., system 100, process 200 or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 9:
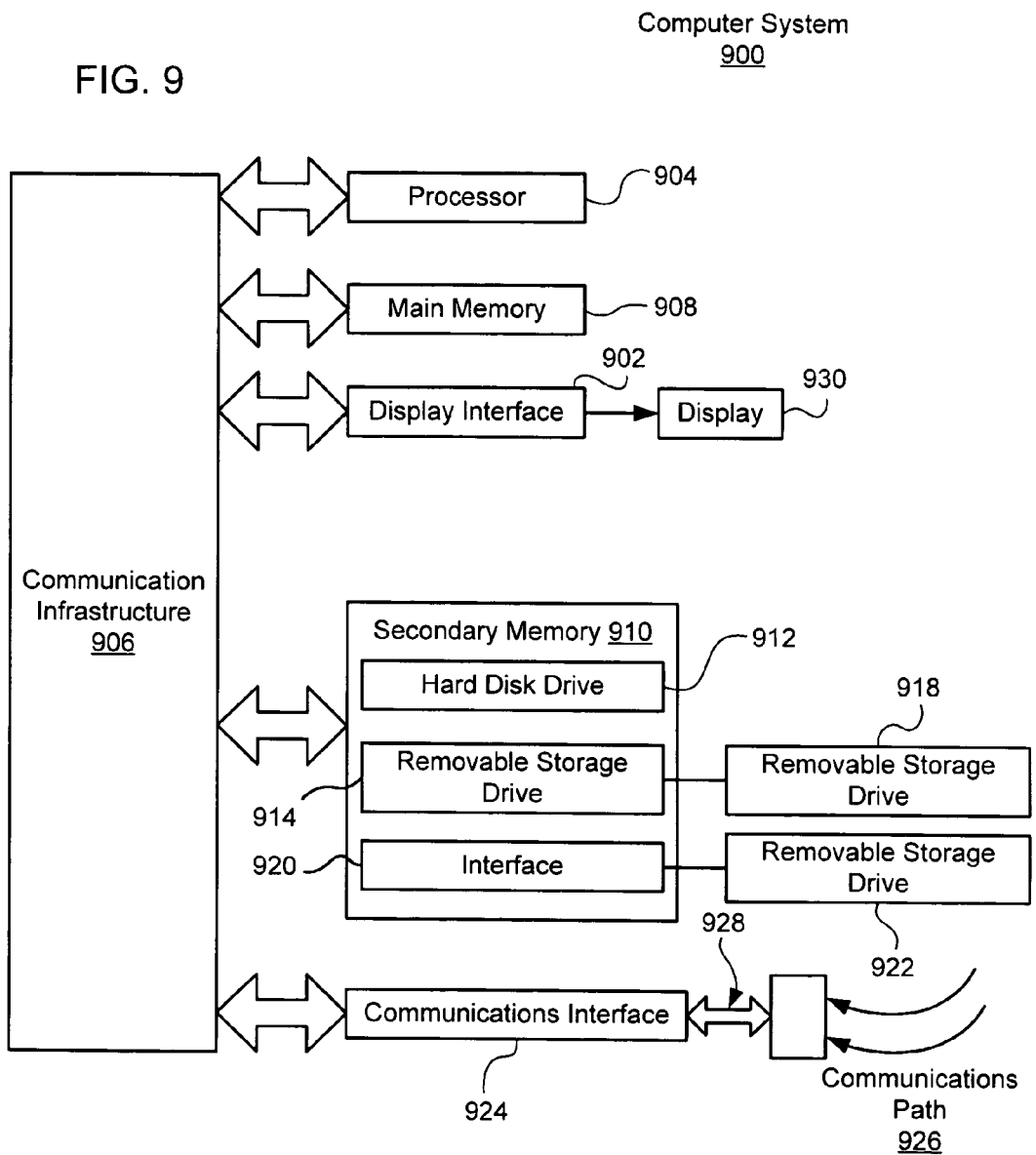
FIG. 9 is a block diagram of an exemplary computer system useful for implementing the present invention.

In fact, in one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents. It is also to be understood that the steps and processes recited in the claims need not be presented in the order presented.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
   generating, by a computer based system for managing expenditures associated with a meeting, scheduling information for a plurality of meetings associated with an organization, wherein each meeting is associated with a spending period, and wherein the spending period comprises a time period before the meeting event, the meeting event, and a time period after the meeting event, and wherein the computer based system comprises a processor and a non-transitory memory;
   generating, by the computer based system, a plurality of budgets, each of the budgets being associated with a meeting and defining at least one budget item, wherein the budget item for the meeting is associated with a vendor name, an expected initial cost, an actual cost and a category code that is selected from a plurality of categories;
   opening, by the computer based system, a spending time period associated with a meeting duration, wherein travel associated with a travel expense falls within the spending time period, and wherein the spending time period is less than a plurality of reoccurring budgeting time periods of the organization;
   receiving, by the computer based system, transaction data describing a plurality of expenditures made using at least one transaction account, wherein the transaction data comprise an amount expended for each of the plurality of expenditures;
   analyzing, by the computer based system, the transaction data describing the plurality of expenditures, wherein the transaction data for each of the plurality of expenditures comprises a date, and wherein the date is compared to the time period before the meeting and the time period after the meeting;
   assigning, by the computer based system, a status to each of the plurality of expenditures, wherein the status includes at least one of related to a meeting and un-reconciled;
   assigning, by the computer based system, the meeting identifier in response to the status of the expenditures being related to the meeting, wherein the expenditures are associated with the meeting identifier, and wherein the expenditures are selectable based on the meeting identifier and a selected date range that is within the time period before the meeting and the time period after the meeting;
   accepting, by the computer based system, a first portion of the plurality of expenditures in response to the first portion having a status of related to a meeting, wherein each expenditure of the first portion of the plurality of expenditures is respectively associated with at least one budget item;
   accruing, by the computer based system, the expenditure with the budget item as an actual cost, wherein the actual cost is comparable with the expected initial cost to determine real time performance;
   identifying, by the computer based system, a second portion of the plurality of expenditures in response to the second portion having a status of un-reconciled;
   closing, by the computer based system, the budget for the meeting in response to the spending time period lapsing; and
   capturing, by the computer based system, transaction data outside the budget in response to the budget being closed.

2. The method of claim 1, wherein the transaction data is received at least daily.

3. The method of claim 1, further comprising converting, by the computer based system, the amount of each expenditure of the first portion of the plurality of expenditures from a first currency into a second currency, wherein the second currency is defined by the budget associated with the meeting event.

4. The method of claim 1, further comprising charging, by the computer based system, the at least a portion of the amount to a subunit of a business organization.

5. The method of claim 1, wherein the transaction data are received over an electronic network.

6. The method of claim 1, further comprising
calculating, by the computer based system, a total amount allocated to a budget item for a selected meeting, wherein the total amount allocated corresponds to the expenditures comprising the meeting identifier; and
providing, by the computer based system, a warning if the total amount allocated exceeds an amount dedicated to the budget item.

7. The method of claim 1, further comprising
receiving, by the computer based system, assignment information for an un-reconciled expenditure; and
assigning, by the computer based system, the un-reconciled expenditure to at least one budget item.

8. A computer based system comprising:
a network interface communicating with a memory;
the memory communicating with a processor for managing expenditures associated with a meeting; and
the processor, when executing a computer program, is configured to:
generate, by the processor, scheduling information for a plurality of meetings associated with an organization, wherein each meeting is associated with a spending period, and wherein the spending period comprises a time period before the meeting event, the meeting event, and a time period after the meeting event, and wherein the computer based system comprises a processor and a non-transitory memory;
generate, by the processor, a plurality of budgets, each of the budgets being associated with a meeting and defining at least one budget item, wherein the budget item for the meeting is associated with a vendor name, an expected initial cost, an actual cost and a category code that is selected from a plurality of categories;
open, by the processor, a spending time period associated with a meeting duration, wherein travel associated with a travel expense falls within the spending time period, and wherein the spending time period is less than a plurality of reoccurring budgeting time periods of the organization;
receive, by the processor, transaction data describing a plurality of expenditures made using at least one transaction account, wherein the transaction data comprise an amount expended for each of the plurality of expenditures;
analyze, by the processor, the transaction data describing the plurality of expenditures, wherein the transaction data for each of the plurality of expenditures comprises a date, and wherein the date is compared to the time period before the meeting and the time period after the meeting;
assign, by the processor, a status to each of the plurality of expenditures, wherein the status includes at least one of related to a meeting and un-reconciled;
assign, by the processor, the meeting identifier in response to the status of the expenditures being related to the meeting, wherein the expenditures are associated with the meeting identifier, and wherein the expenditures are selectable based on the meeting identifier and a selected date range that is within the time period before the meeting and the time period after the meeting;
accept, by the processor, a first portion of the plurality of expenditures in response to the first portion having a status of related to a meeting, wherein each expenditure of the first portion of the plurality of expenditures is associated with at least one budget item;
accrue, by the processor, the expenditure with the budget item as an actual cost, wherein the actual cost is comparable with the expected initial cost to determine real time performance;
identify, by the processor, a second portion of the plurality of expenditures in response to the second portion having a status of un-reconciled
close, by the processor, the budget for the meeting in response to the spending time period lapsing; and
capture, by the processor, transaction data outside the budget in response to the budget being closed.

9. A tangible non-transitory computer-readable storage medium having computer-executable instructions stored thereon that, if executed by a computer based system for managing expenditures associated with a meeting, cause the computer based system to perform a method comprising:
generating, by a computer based system, scheduling information for a plurality of meetings associated with an organization, wherein each meeting is associated with a spending period, and wherein the spending period comprises a time period before the meeting event, the meeting event, and a time period after the meeting event, and wherein the computer based system comprises a processor and a non-transitory memory;
generating, by a computer based system, a plurality of budgets, each of the budgets being associated with a meeting and defining at least one budget item, wherein the budget item for the meeting is associated with a vendor name, an expected initial cost, an actual cost and a category code that is selected from a plurality of categories;
opening, by the computer based system, a spending time period associated with a meeting duration, wherein travel associated with a travel expense falls within the spending time period, and wherein the spending time period is less than a plurality of reoccurring budgeting time periods of the organization;
receiving, by the computer based system, transaction data describing a plurality of expenditures made using at least one transaction account, wherein the transaction data comprise an amount expended for each of the plurality of expenditures;
analyzing, by the computer based system, the transaction data describing the plurality of expenditures, wherein the transaction data for each of the plurality of expenditures comprises a date, and wherein the date is compared to the time period before the meeting and the time period after the meeting;
assigning, by the computer based system, a status to each of the plurality of expenditures, wherein the status includes at least one of related to a meeting and un-reconciled;
assigning, by the computer based system, the meeting identifier in response to the status of the expenditures being related to the meeting, wherein the expenditures are associated with the meeting identifier, and wherein the expenditures are selectable based on the meeting identifier and a selected date range that is within the time period before the meeting and the time period after the meeting;
accepting, by the computer based system, a first portion of the plurality of expenditures in response to the first portion having a status of related to a meeting, wherein each expenditure of the first portion of the plurality of expenditures is associated with at least one budget item;

accruing, by the computer based system, the expenditure with the budget item as an actual cost, wherein the actual cost is comparable with the expected initial cost to determine real time performance;

identifying, by the computer based system, a second portion of the plurality of expenditures in response to the second portion having a status of un-reconciled;

closing, by the computer based system, the budget for the meeting in response to the spending time period lapsing; and capturing, by the computer based system, transaction data outside the budget in response to the budget being closed.

10. The method of claim 1, wherein the budget item for the meeting includes a travel expense related to the meeting, and wherein the meeting comprises a meeting identifier.

* * * * *